J. A. ROCHE & G. V. ORTON.
Wheels or Pulleys for Band-Saws.
No. 140,794. Patented July 15, 1873.
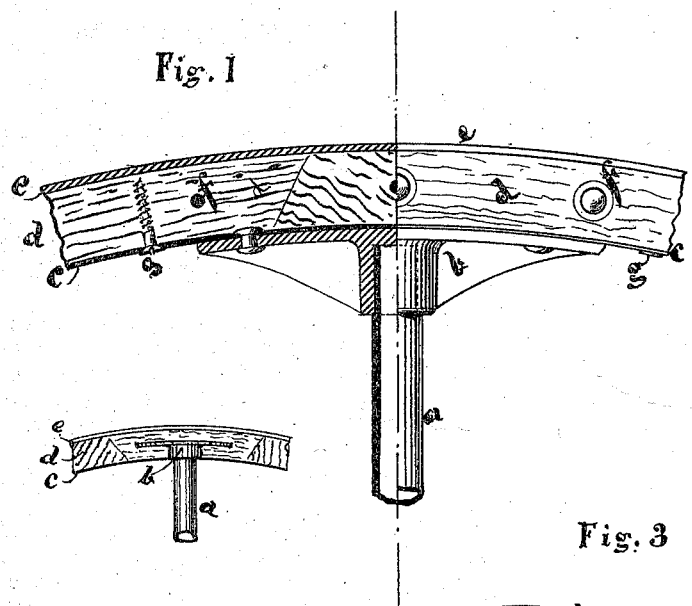
Fig. 1
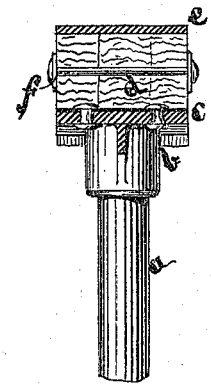
Fig. 2
Fig. 4
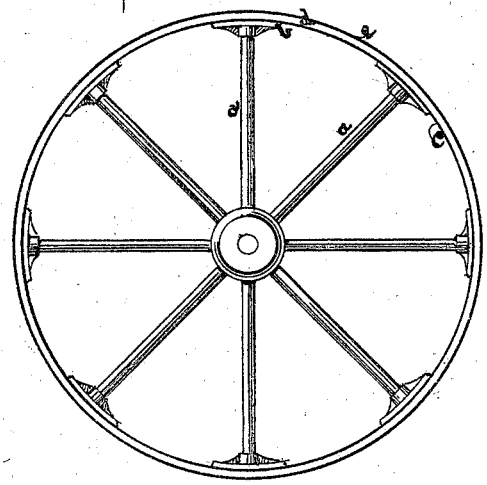
Fig. 3
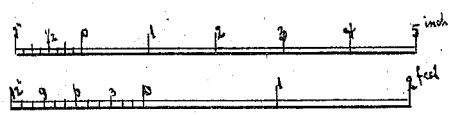
Scale for Fig. 1 & 2
Scale for Fig. 3
Witnesses:
Julius Wick
L. T. Akin
Inventors:
John A. Roche
Gerrit V. Orton

UNITED STATES PATENT OFFICE.

JOHN A. ROCHE AND GERRIT V. ORTON, OF CHICAGO, ILLINOIS.

IMPROVEMENT IN WHEELS OR PULLEYS FOR BAND-SAWS.

Specification forming part of Letters Patent No. 140,794, dated July 15, 1873; application filed March 17, 1873.

*To all whom it may concern:*

Be it known that we, JOHN A. ROCHE and GERRIT V. ORTON, both of the city of Chicago, county of Cook and State of Illinois, have invented certain Improvements in Wheels or Pulleys for Band-Saws, of which the following is a specification:

Our invention consists of the use of cork in the formation of the rims of wheels for band-saws, in combination with iron or other substances to give requisite strength, and leather or other material upon the outer circumference to prevent the saw wearing away the rim by the continued friction caused by running thereon.

That the object of our invention may be more perfectly understood, it becomes necessary that the requirements of the rims of wheels used upon machines upon which endless or band saws are used should be stated: First, experience has shown that such wheels should be made as light as possible in weight consistent with the strength required to prevent the overlapping or buckling of the saw, which may be caused by the momentum of the upper or idler wheel, when the saw is suddenly checked, by forcing the stuff to be sawed upon it, as the lighter the wheel the less momentum, and, consequently, less danger of overlapping or buckling the saw, which has been found to be one cause of the breaking of the saws. Second, said wheel-rims should also be elastic. The tendency of a hard and inelastic rim to break a saw is so very apparent that further remark is deemed unnecessary. Third, such rims should also be made of such material as will not be affected by atmospheric or other moisture, as material used for this purpose which, by the absorption of water, would swell, and then, upon becoming dried, will shrink and cause the wheel-rims to lose their perfectness by becoming eccentric, or, to use a machinist's phrase, untrue, which also is the frequent cause of the breaking of saws. This cork being very light, elastic, and impervious to water, the value of our invention is readily seen.

That others may be enabled to understand and construct wheels according to our invention, reference may be had to drawings annexed to and forming a part of this specification, the same letters always indicating the same parts in each and all figures and in this specification.

Figure 1 is a side elevation, partly in section, showing a portion of a wheel-rim as constructed by us. Fig. 2 is a cross-section through the center of Fig. 1. Fig. 3 shows a view of our rim as it may be applied to a wheel. Fig. 4 is a view, showing another mode of fastening our rims to the arms of a wheel.

Letter $a$ is a portion of an arm or spoke of a wheel. Letter $b$ is a shoe fitted to the end of the arm $a$ to support the metallic hoop $c$, which is riveted firmly to the shoe $b$, which hoop is of sufficient strength to withstand the strain without yielding or becoming untrue. Letter $d$ is cork laid up in sections and cemented together and held by the screws $g\ g$. Letter $e$ is a leather band stretched over all, and upon which the saw runs. Letters $f\ f$ are rivets, which prevent the cork from spreading.

We are aware that wheels for band-saws have heretofore been constructed, substantially as here described, with wooden rims in the place where we use cork.

What we do claim, and desire to secure by Letters Patent, is—

1. The use of cork for wheel-rims for band-saws, for the purposes set forth.
2. The construction of the cork rim $d$ in combination with the hoop $c$ and the band $e$.
3. The combination of the cork rim $d$, the hoop $c$, the band $e$ with the arms and hub of a wheel used for the purpose set forth.

JOHN A. ROCHE.
GERRIT V. ORTON.

Witnesses:
JULIUS WELCKE,
L. D. AKIN.